United States Patent
Misawa

(10) Patent No.: US 6,864,474 B2
(45) Date of Patent: Mar. 8, 2005

(54) FOCUSING APPARATUS FOR ADJUSTING FOCUS OF AN OPTICAL INSTRUMENT

(75) Inventor: Atsushi Misawa, Saitama (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 77 days.

(21) Appl. No.: 10/339,331

(22) Filed: Jan. 10, 2003

(65) Prior Publication Data

US 2003/0150973 A1 Aug. 14, 2003

(30) Foreign Application Priority Data

Feb. 8, 2002 (JP) .......................................... 2002-033157

(51) Int. Cl.[7] .............................................. G02B 27/40
(52) U.S. Cl. ................................................. 250/201.4
(58) Field of Search ............................ 250/201.2–201.8

(56) References Cited

U.S. PATENT DOCUMENTS 6,473,228 B1 * 10/2002 Toshimitsu ................. 359/368

FOREIGN PATENT DOCUMENTS

JP         10-293245         11/1998

* cited by examiner

Primary Examiner—Thanh X. Luu
(74) Attorney, Agent, or Firm—Sughrue Mion, PLLC

(57) ABSTRACT

A focusing apparatus adjusting the focus of an optical apparatus includes an optical unit for forming a subject image, a contrast detecting unit for detecting contrast value of subject image acquired by the optical unit, a distance measuring unit for computing distance information indicating a distance to the subject, an adjustment command receiving unit for receiving command information indicating a request to adjust a focus of the optical unit, a focus control unit for performing contrast detection by hill-climbing method when the adjustment command receiving unit receives the command information, a difference information computing unit for computing difference information indicating a difference between a focusing position detected by the focus control unit, which performs the contrast detection by hill-climbing method, and an adjustment position of the optical unit corresponding to the distance information computed by the distance measuring unit, and a difference information storing unit for storing the difference information computed by the difference information computing unit, wherein the focus control unit determines a condition of the contrast detection by hill-climbing method on the basis of the difference information stored in the difference information storing unit and distance information.

5 Claims, 4 Drawing Sheets

150

| RECORD NUMBER | DIFFERENCE | FOCUSING POSITION |
|---|---|---|
| 1 | +3 | 93 |
| 2 | +1 | 61 |
| 3 | −2 | 27 |
| 4 | +2 | 78 |
| 5 | −4 | 2 |

FIG. 2

FOCUSING APPARATUS FOR ADJUSTING FOCUS OF AN OPTICAL INSTRUMENT

The present application claims priority from a Japanese Patent Application No. 2002-033157 filed on Feb. 8, 2002, the contents of which are enclosed herein by reference.

BACKGROUND OF THE INVENTION

1. Field of the Invention

The present invention relates to a focusing apparatus. More particularly, the present invention relates to a focusing apparatus for adjusting focus of optical instrument.

2. Description of the Related Art

Japanese Laid-Open Patent Application No. 10-293245 discloses an electronic camera which performs supplemental focusing with contrast focus control means after performing focusing with a focus control means by external metering.

However, according to the above described conventional electronic camera, the contrast focus control means performs contrast detection by hill-climbing method, where the contrast focus control means measures contrast value from solid state image pick-up device like a CCD or a CMOS image sensor and finds out a focusing position on which the contrast value becomes a maximum value by gradually pushing out the optical unit. Since the contrast focus control means needs to move the optical unit for several times intermittently to perform the contrast detection by hill-climbing method, there is a problem that it takes time for the optical unit to reach the focusing position.

Therefore, it is an object of the present invention to provide a focusing apparatus, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, a focusing apparatus for adjusting focus of an optical instrument including: an optical unit for acquiring light from a subject and forming a subject image; a contrast detecting unit for detecting contrast value of the subject image acquired by the optical unit; a distance measuring unit for computing distance information indicating a distance from the focusing apparatus to the subject; an adjustment command receiving unit for receiving command information indicating a request to adjust the focus of the optical unit; a focus control unit for performing contrast detection by hill-climbing method by acquiring a contrast value step-by-step by moving at least a part of the optical unit step-by-step, and detecting a position of the optical unit, where the acquired contrast value becomes a maximum values, as a focusing position, when the adjustment command receiving unit receives the command information; a difference information computing unit for computing difference information indicating the difference between the focusing position detected by the focus control unit, which performs the contrast detection by hill-climbing method, and an adjustment position of the optical unit corresponding to the distance information computed by the distance measuring unit; and a difference information storing unit for storing the difference information computed by the difference information computing unit, wherein the distance measuring unit newly computes distance information when the adjustment command receiving unit receives command information later, and the focus control unit determines a condition for the contrast detection by hill-climbing method on the basis of the difference information stored in the difference information storing unit and distance information newly computed by the distance measuring unit.

The focus control unit may determine width of an adjustment range of the optical unit, which performs the contrast detection by hill-climbing method, on the basis of the difference information stored in the difference information storing unit and the distance information newly computed by the distance measuring unit. Moreover, the focus control unit may determine a center of an adjustment range of the optical unit, which performs the contrast detection by hill-climbing method, on the basis of the difference information stored in the difference information storing unit and the distance information newly computed by the distance measuring unit.

The summary of the invention does not necessarily describe all necessary features of the present invention. The present invention may also be a sub-combination of the features described above.

BRIEF DESCRIPTION OF THE DRAWINGS

FIG. 2 shows a table stored in a difference information storing unit 150.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention. In addition, a "image capturing apparatus" used in the detailed description of this specification is an example of "focusing apparatus" described in the appended claims.

Figure 1:
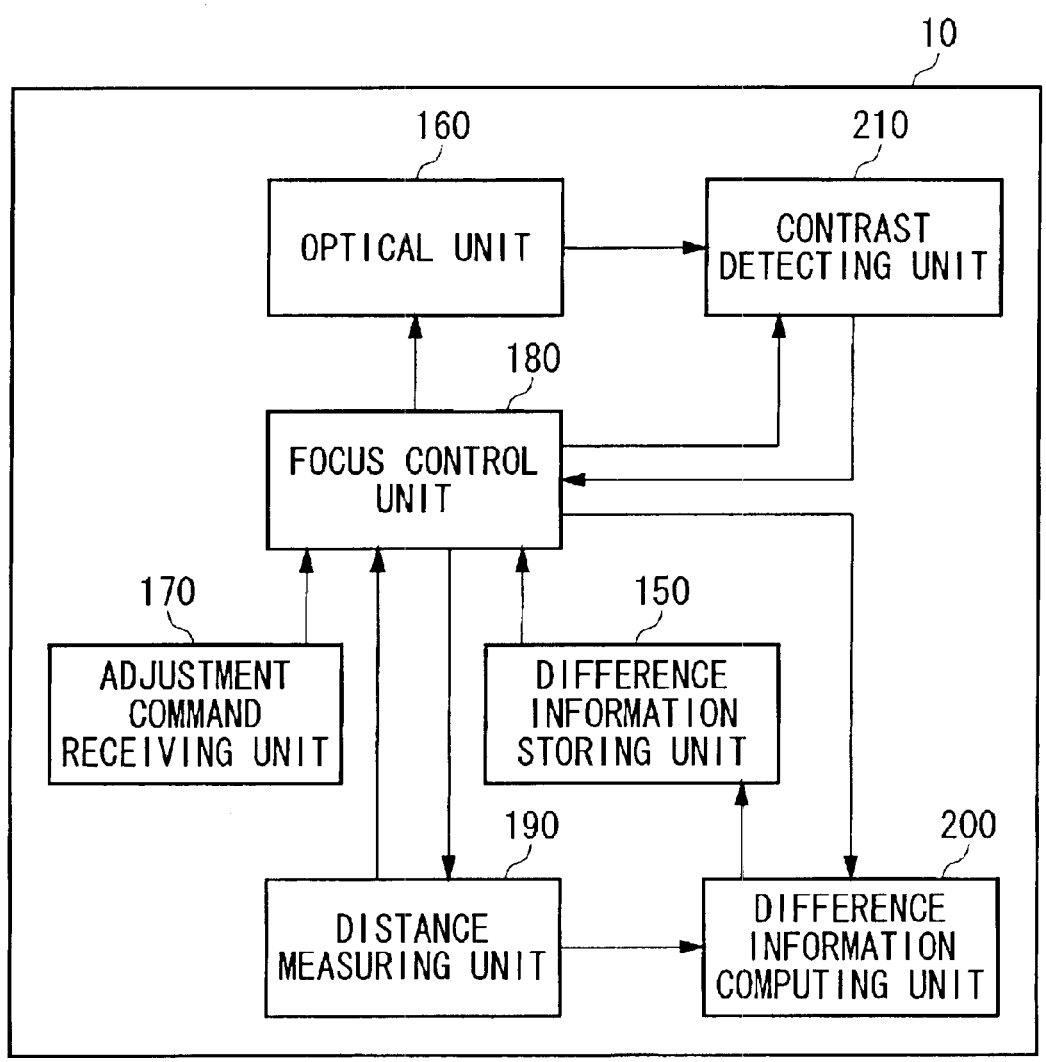
FIG. 1 shows a functional structure of an image capturing apparatus 10.

FIG. 1 shows an example of a characteristic functional structure of an image capturing apparatus 10 of an embodiment of the present invention. The image capturing apparatus 10 according to the present embodiment adjusts a focus of an optical unit on the basis of contrast value of a subject image and distance information indicating distance from the image capturing apparatus 10 to the subject. The image capturing apparatus 10 performs the contrast detection by hill-climbing method where contrast value is acquired step by step by moving at least a part of the optical unit step by step, and a position, on which the acquired contrast value becomes a maximum value, is detected as a focusing position.

The image capturing apparatus 10 includes a difference information storing unit 150, an optical unit 160, an adjustment command receiving unit 170, a focus control unit 180, a distance measuring unit 190, a difference information computing unit 200 and a contrast detecting unit 210.

The difference information storing unit 150 stores difference information indicating difference between a position, which corresponds to distance information, of the optical unit 160 and the focusing position, and the difference information corresponds to focusing position information indicating focusing position of the optical unit 160. The optical unit 160 forms a subject image by acquiring lights from the subject. The optical unit 160 includes a plurality of lenses. The adjustment command receiving unit 170 receives command information indicating a command for adjusting the focusing position of the subject image formed by the optical unit 160. The adjustment command receiving unit 170 sends the received command information to the focus control unit 180.

If the focus control unit 180 receives command information from the adjustment command receiving unit 170, the focus control unit 180 sends distance computation requesting information indicating a request for computing distance to the subject from the image capturing apparatus 10 to the distance measuring unit 190. If the distance measuring unit 190 receives the distance computation requesting information from the focus control unit 180, the distance measuring unit 190 produces distance information indicating the distance to the subject from the image capturing apparatus 10, and sends the distance information to the focus control unit 180. Further, the distance measuring unit 190 sends the distance information to the difference information computing unit 200.

The focus control unit 180 receives the distance information from the distance measuring unit 190. Then, the focus control unit 180 computes an adjustment position, which is a position of a lens of the optical unit 160 and is corresponding to the received distance information. Then, the focus control unit 180 reads out difference information stored with correspondence to the focusing position which is the closest to the adjustment position from the difference information storing unit 150. The focus control unit 180 determines a central position of an adjustment range of the optical unit 160 which performs the contrast detection by hill-climbing method on the basis of new distance information computed by the distance measuring unit 190 and difference information readout from the difference information storing unit 150. Concretely, the focus control unit 180 determines a position of the lens of the optical unit 160, which can be obtained by adding difference information to the adjustment position, as the center position of the adjustment range of the optical unit 160.

Moreover, the focus control unit 180 determines adjustment range of the optical unit 160 which performs the contrast detection by hill-climbing method on the basis of difference information read out form the difference information storing unit 150. For example, if the difference indicated by the difference information is large, the focus control unit 180 widens the adjustment range of the optical unit 160. Moreover, if the difference indicated by difference information is small, the focus control unit 160 may narrow the adjustment range of the optical unit 160. The focus control unit 180 performs the contrast detection by hill-climbing method within the determined adjustment range of the optical unit 160.

Then, the focus control unit 180 moves the lens of the optical unit 160 to a position where the contrast value becomes a maximum value. The focus control unit 180 sends difference requesting information indicating a request for computing new difference information and focusing position information indicating the focusing position on which the contrast value detected by the contrast detecting unit 210 becomes a maximum value to the difference information computing unit 200. The difference information computing unit 200 receives the difference requesting information and the focusing position information from the focus control unit 180. Then, the difference information computing unit 200 receives distance information from the distance measuring unit 190. Then, the difference information computing unit 200 computes the adjustment position from received distance information. The difference information computing unit 200 computes difference information indicating the difference between the focusing position and the adjustment position. The difference information computing unit 200 stores newly computed new difference information as difference information. Moreover, the difference information computing unit 200 stores the focusing position information corresponding to the new difference information.

FIG. 2 shows a table stored in the difference information storing unit 150. The difference information storing unit 150 includes a record number field, a difference field, and a focusing position field. The record number field stores numbers each of which identifies a record of a difference. The difference field stores difference between the focusing position of the optical unit 160 detected by hill-climbing method, where the contrast value becomes a maximum value, and the position of the optical unit 160 corresponding to distance information computed by the distance measuring unit 190. The difference field stores difference information computed by the difference information computing unit 200. The focusing position field stores the focusing position of the optical unit 160 which is detected by performing the contrast detection by hill-climbing method with the focus control unit 180. Here, each value stored in the difference field and the focusing position field is, for example, in a range of 1 to 100, where each of the values indicates a position of the lens of the optical unit 160 when each possible position of the lens of optical unit 160 is designated as one of total 100 positions.

Figure 3:
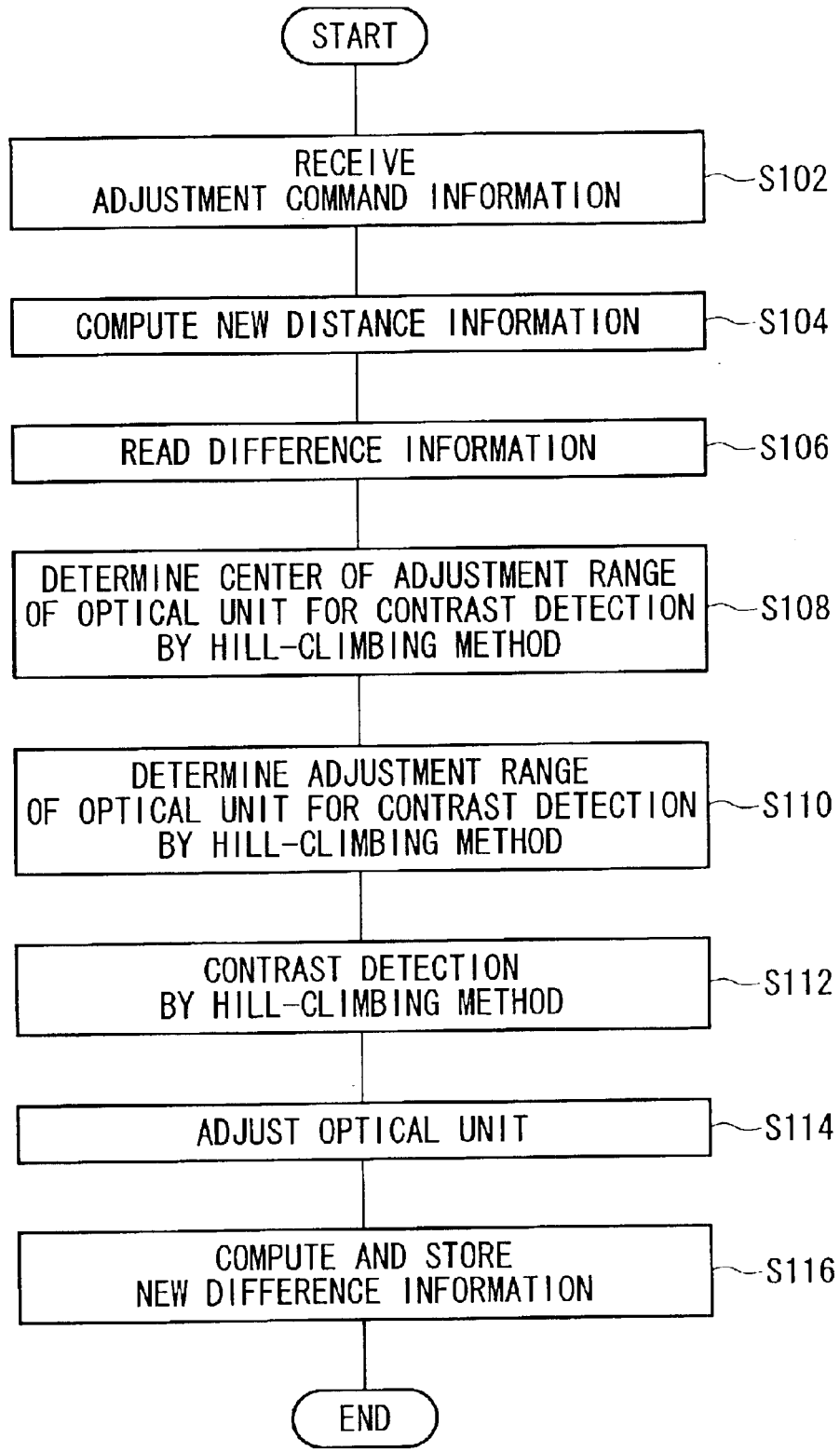
FIG. 3 shows a flowchart illustrating operation of the image capturing apparatus 10 according to an embodiment of the present invention.

FIG. 3 is a flowchart illustrating operation of the image capturing apparatus 10 according to an embodiment of the present invention. The adjustment command receiving unit 170 receives the adjustment command information (step S102). Then, the distance measuring unit 190 computes new distance information indicating a distance from the image capturing apparatus 10 to the subject (step S104). Then, the focus control unit 180 computes an adjustment position which is a position of the optical unit 160 corresponding to the distance information. The focus control unit 180 reads out difference information stored with correspondence to the focusing position, which is the closest to the adjustment position, from the difference information storing unit 150 (step S106).

Then, the focus control unit 180 determines a center of an adjustment range of the optical unit 160 which performs contrast detection by hill-climbing method on the basis of the new distance information computed by the distance measuring unit 190 and the difference information read out from the difference information storing unit 150 (step S108). Then, the focus control unit 180 determines the adjustment range of the optical unit 160 which performs contrast detection by hill-climbing method on the basis of difference information read out from the difference information storing unit 150 (step S110). Then, the focus control unit 180 acquires contrast value step-by-step by moving the optical unit 160 step-by-step, and detects the position, where the acquired contrast value becomes a maximum value, of the optical unit 160 as the focusing position (step S112).

Then, the focus control unit 180 adjusts the optical unit 160 to a position where the contrast value becomes a maximum value (step S114). Then, the difference information computing unit 200 newly computes difference information indicating a difference between the focusing position of the optical unit 160 corresponding to the contrast value newly detected by the contrast detecting unit 210 and the adjustment position of the optical unit 160 corresponding to the distance to the subject computed by the distance measuring unit 190. The difference information computing unit 200 stores in the difference information storing unit 150 the computed difference information corresponding to the focusing position information indicating the focusing position of the optical unit 160 (step S116).

Like this, the image capturing apparatus 10 may determine a proper range for performing the contrast detection by hill-climbing method by adding difference information indicating the past difference to the adjustment position. Therefore, the image capturing apparatus 10 may minimize the required time to adjust focus of the optical unit 160 by performing the contrast detection by hill-climbing method within the proper range.

Figure 4:
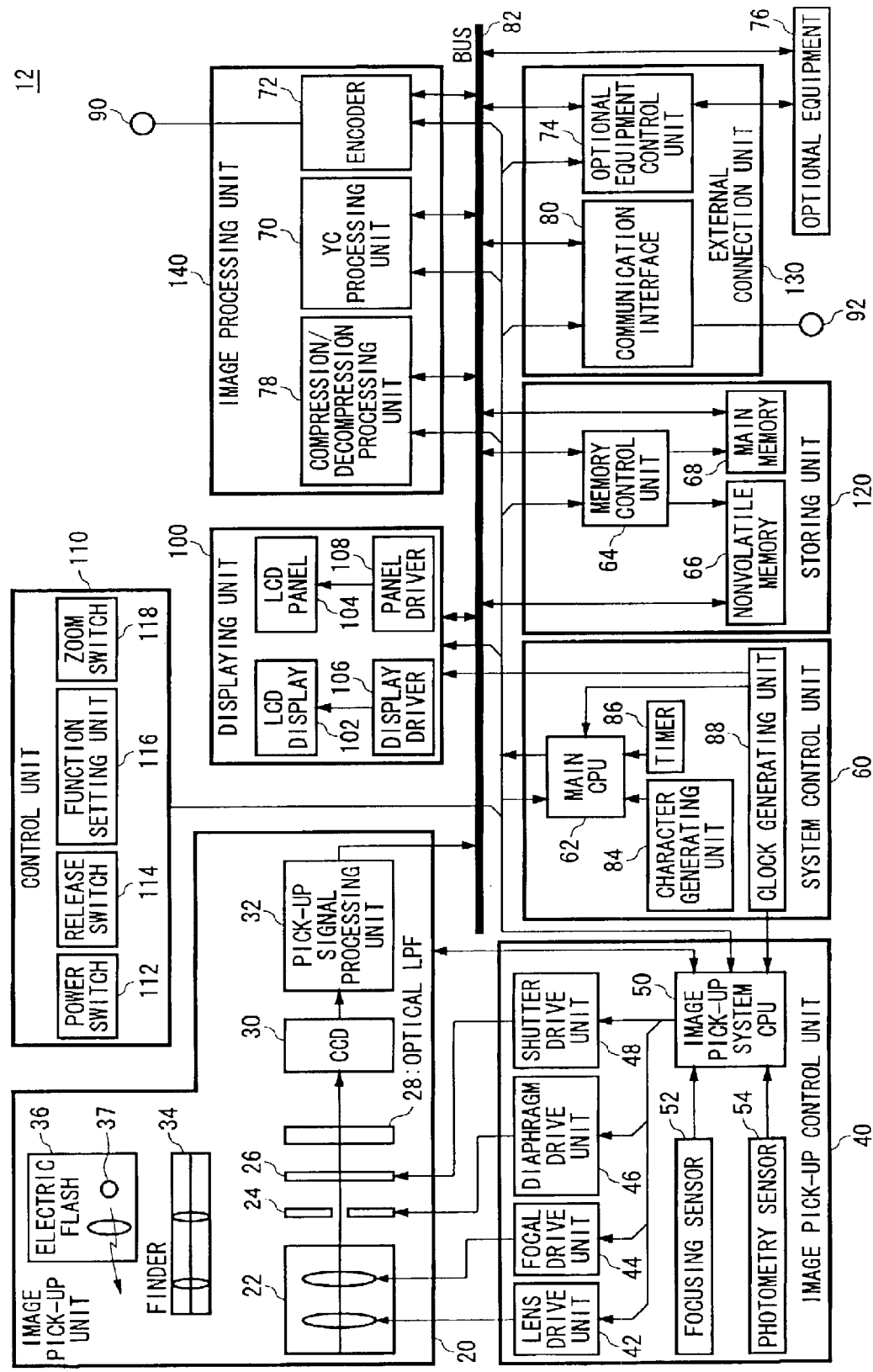
FIG. 4 shows a structure of a digital camera 12 equipped with the image capturing apparatus 10.

FIG. 4 is a block diagram showing an example of a configuration of the digital camera 12 according to the present embodiment. The digital camera 12 is an example of the image capturing apparatus 10 according to the present embodiment. The digital camera 12 includes the image pick-up unit 20, an image pick-up control unit 40, a system control unit 60, a displaying unit 100, a control unit 110, the storing unit 120, an external connection unit 130 and the image processing unit 140.

The image pick-up unit 20 includes an optical unit 22, a diaphragm 24, a shutter 26, optical LPF 28 (low pass filter), the CCD 30 (charge-coupled device), the pick-up signal processing unit 32, a finder 34, and the electric flash 36.

The optical unit 22 takes and processes a subject image. The optical unit 22 includes a focal lens, a zoom lens, etc., and forms the image of the subject onto surface of the CCD 30. The diaphragm 24 limits the light which passes the optical unit 22, and the optical LPF 28 passes light having longer wavelength component than a predetermined wavelength. Each of the sensor elements included in the CCD 30 stores charge according to quantity of light of the formed subject image (the charge is referred to as "stored charge" hereinafter).

The shutter 26 is a mechanical shutter and controls whether to form the image of the light onto the CCD 30, the light passing the optical unit 22. The digital camera 12 may include an electronic shutter function instead of the mechanical shutter 26. In order to realize the electronic shutter function, each of the sensor elements of the CCD 30 has a shutter gate and a shutter drain. The stored charge is discharged to the shutter drain by turning on the shutter gate. Duration of storing the charge to each of the sensor elements, i.e., shutter speed, is controllable by controlling the shutter gate. In the CCD 30, the stored charge is read by a shift register by applying a readout gate pulse, and is read sequentially as a voltage signal by applying the register transfer pulse.

The pick-up signal processing unit 32 separates the voltage signal indicating the subject image outputted from the CCD 30, i.e., an analog signal, into R, G, and B components. The pick-up signal processing unit 32 adjusts white balance of the subject image by adjusting R, G, and B components. The pick-up signal processing unit 32 performs gamma correction of the subject image. The pick-up signal processing unit 32 converts the analog signal, which is separated into R, G, and B components, to a digital signal, and image data of the digital signal of the subject image (referred to as "digital image data" hereinafter), obtained by the A/D conversion, is outputted to the system control unit 60.

The finder 34 may have a displaying means and may display various information from below-mentioned main CPU 62, etc. The electric flash 36 includes a discharge tube 37, which discharges energy stored in a capacitor, and when the energy is supplied to the discharge tube 37, the electric flash 36 functions by the discharge tube 37 emitting light.

The image pick-up control unit 40 includes a lens drive unit 42, a focal drive unit 44, a diaphragm drive unit 46, a shutter drive unit 48, an image pick-up system CPU 50 which controls the drive units above, a focusing sensor 52, and the photometry sensor 54. The lens drive unit 42, the focal drive unit 44, the diaphragm drive unit 46, and the shutter drive unit 48 include driving means, such as a stepping motor, and drive mechanical components in the image pick-up unit 20. According to depression of the release switch 114, the focusing sensor 52 measures distance to the subject, and the photometry sensor 54 measures brightness of the subject. The focusing sensor 52 and the photometry sensor 54 supply focusing data and photometry data to the image pick-up system CPU 50, where the focusing data means the data of the measured distance to the subject, and the photometry data means the data of the measured brightness of the subject.

The image pick-up system CPU 50 controls the lens drive unit 42 and the focal drive unit 44, and adjusts a zoom magnification and a focus of the optical unit 22 based on photography information, such as a zoom magnification directed by a user. Alternatively, the image pick-up system CPU 50 may control the lens drive unit 42 and the focal drive unit 44, and may adjust a zoom magnification and a focus based on the focusing data received from the focusing sensor 52.

The image pick-up system CPU 50 determines stop and shutter speed based on the photometry data received from the photometry sensor 54. The diaphragm drive unit 46 and the shutter drive unit 48 control the aperture size of the diaphragm 24, and the opening and closing of the shutter 26 in accordance with the determined value.

The image pick-up system CPU 50 controls light emission of the electric flash 36 based on the photometry data received from the photometry sensor 54, and adjusts the aperture size of the diaphragm 26 simultaneously. When the user instructs to take an image, the CCD 30 starts to store the charge and outputs the stored charge to the pick-up signal processing unit 32 after the shutter time calculated from the photometry data is elapsed.

The system control unit 60 includes main CPU 62, a character generating unit 84, a timer 86, and a clock generating unit 88. The main CPU 62 controls whole parts of the digital camera 12, especially the system control unit 60. The main CPU 62 sends and receives required information to/from the image pick-up systems CPU 50 by serial communication or the like.

The clock generating unit 88 generates an internal clock of the main CPU 62, and supplies it to the main CPU 62. The clock generating unit 88 also generates internal clocks of the image pick-up system CPU 50 and the displaying unit 100. The clock generating unit 88 may supply the clocks having different frequencies to the main CPU 62, the image pick-up system CPU 50, and the displaying unit 100, respectively.

The character generating unit 84 generates text and graphic information, which is superimposed onto the captured image, such as date/time or a title of the image. A timer 86 has backing of battery etc., counts time always, and supplies time information, such as information about the captured date/time of the captured image, to the main CPU 62 based on the counted value. It is preferable that the power is supplied to the timer 86 from the battery so as to count time even when main power supply of the digital camera is switched off. It is also preferable that the character generating unit 84 and the timer 86 are annexed to the main CPU 62.

The storing unit 120 includes a memory control unit 64, nonvolatile memory 66, and main memory 68. The memory control unit 64 controls the nonvolatile memory 66 and the main memory 68. The nonvolatile memory 66 is composed of EEPROM (electrically erasable programmable read only memory) or flash memories etc., and stores it with data which is to be held even when the power supply of the digital camera 12 is switched off, such as setting information set by a user or a factory preset value. The nonvolatile memory 66 may store a boot program, a system program, etc. of the main CPU 62.

It is preferable that the main memory 68 is composed of memory which is relatively inexpensive and has large capacity, like DRAM. The main memory 68 has a function as frame memory to store the data outputted from the image pick-up unit 20, a function as system memory which loads various programs, and a function as a work area. The nonvolatile memory 66 and the main memory 68 communicate with each part inside/outside the system control unit 60 through a bus 82. The nonvolatile memory 66 may further store the digital image data.

The image processing unit 140 includes an YC processing unit 70, an encoder 72, and a compression/decompression processing unit 78. The external connection unit 130 includes an optional equipment control unit 74 and a communication interface 80.

The YC processing unit 70 performs YC conversion to the digital image data, and generates a luminance signal Y, a color difference signals B–Y and R–Y. The main memory 68 stores the luminance signal and the color difference signals based on control of the memory control unit 64.

The compression/decompression processing unit 78 reads the luminance signal and the color difference signals sequentially from the main memory 68, and compresses them. Then the optional equipment control unit 74 writes the compressed digital image data (referred to as "compressed data") in a memory card which is an example of the optional equipment 76.

The encoder 72 converts the luminance signal and the color difference signals into a video signal (such as NTSC or PAL signal), and outputs the video signal from a terminal 90. When generating the video signal from the compressed data recorded on the optional equipment 76, the compressed data is supplied to the compression/decompression processing unit 78 at first through the optional equipment control unit 74. Then, the data is decompressed in the compression/decompression processing unit 78 and the encoder 72 converts the decompressed data into the video signal.

The optional equipment control unit 74 performs generation, logical conversion, and/or voltage conversion of the signal that flows between the bus 82 and the optional equipment 76, in order to conform the signal to the specification of the optional equipment 76 and the bus 82. Other than the above-mentioned memory card, the digital camera 12 may support a standard PCMCIA I/O card, for example, as the optional equipment 76. In this case, the optional equipment control unit 74 may be composed of bus control LSI for PCMCIA standard or the like.

The communication interface 80 performs control such as protocol conversion to comply with the communication specification supported by the digital camera 12, e.g., USB, RS-232C, Ethernet, etc. The communication interface 80 may output the compressed data or the digital image data to external equipment or to a network through a terminal 92. The communication interface 80 includes a driver IC if necessary and communicates with external equipment through the terminal 92. The communication interface 80 may be adapted to communicate with the external equipment, such as a printer, a Karaoke machine or a video game machine, through an original standard interface.

The displaying unit 100 includes an LCD display 102, an LCD panel 104, a display driver 106, and a panel driver 108. The display driver 106 controls the LCD display 102. The panel driver 108 controls the LCD panel 104. The LCD display 102 is positioned on the back face of the camera, of which the size is about 2 inches for example, and displays an image currently captured, a playback image, zoom magnification of the captured or playback image, remaining battery charge, date/time, mode selection screen, a subject image, etc. The LCD panel 104 is a monochrome LCD, for example, is positioned on top face of the camera, and displays information, such as quality of the image (fine, normal, basic, etc.), flash mode (forced flash, suppressed flash, etc), number of available frames, number of pixels, and remaining battery charge.

The control unit 110 includes a power switch 112, the release switch 114, a function setting unit 116, and a zoom switch 118. The power switch 112 switches the digital camera 12 on and off based on direction of a user. The release switch 114 can be depressed in two levels, i.e., halfway depression and full depression. For example, when the release switch 114 is depressed halfway, the image pick-up control unit 40 performs automatic focusing and automatic exposure, and the image pick-up unit 20 captures a subject image by depressing the release switch 114 fully. The release switch 114 sends command information to request the image pick-up system CPU to adjust the focus position when the release switch 114 is depressed halfway.

The function setting unit 116 is, for example, a rotatable mode dial or a 4-direction button and accepts settings such as "file format", "special effect", "print", "determine/save", "change display", etc. The zoom switch 118 accepts setting of zoom magnification of the subject image captured by the image pick-up unit 20.

The digital camera 12 having the above-mentioned structure operates in the following manner. First, the power switch 112 is depressed and power is supplied to each part of the digital camera 12. The main CPU 62 judges whether the digital camera 12 is in photography mode or in playback mode by reading status of the function setting unit 116.

When a digital camera 12 is in photography mode, the main CPU 62 supervises the depression status of the release switch 114. When the half-depression of the release switch 114 is detected, the image pick-up system CPU 50 acquires photometry data and focusing data from the photometry sensor 54 and the focusing sensor 52, respectively. The image pick-up control unit 40 adjusts focus and stop of the image pick-up unit 20, etc. based on the photometry data and the focusing data acquired by the image pick-up system CPU 50. After the adjustment, the LCD display 102 informs a user about the completion of the adjustment by displaying characters, such as "standby".

Then, the main CPU 62 supervises the depression status of the release switch 114. When the full-depression of the release switch 114 is detected, the shutter 26 is closed after a predetermined shutter time is elapsed and the stored charge of the CCD 30 is discharged to the pick-up signal processing unit 32. The digital image data, generated as a result of processing by the pick-up signal processing unit 32, is outputted to the bus 82. The digital image data is once stored in the main memory 68, then it is processed in the YC processing unit 70 and the compression/decompression processing unit 78, and is recorded in the optional equipment 76 via the optional equipment control unit 74. The captured image based on the recorded digital image data is displayed on the LCD display 102 for a while, so that a user can check the captured image. As described above, a sequence of the photographing operation is finished.

On the other hand, when the digital camera 12 is in playback mode, the main CPU 62 reads the captured image from the main memory 68, the nonvolatile memory 66, and/or the optional equipment 76, and displays the image on the LCD display 102 of the displaying unit 100.

In this state, when a user directs either "move forward" or "move backward" on the function setting unit 116, the main CPU 62 reads another captured image stored in the main memory 68, the nonvolatile memory 66, and/or the optional equipment 76, and displays the image on the LCD display 102 of the displaying unit 100.

In addition, function of the optical unit 22 shown in FIG. 4 is corresponding to that of the optical unit 160 shown in FIG. 1. The CCD 30 and the pick-up signal processing unit 32 shown in FIG. 4 is corresponding to the contrast detecting unit 210 shown in FIG. 1. Function of the distance measuring sensor 52 shown in FIG. 4 is corresponding to that of the distance measuring unit 190 shown in FIG. 1. Function of the image pick-up system CPU 50 shown in FIG. 4 is corresponding to that of the focus control unit 180 and the difference information computing unit 200 shown in FIG. 1. The main memory 68 shown in FIG. 4 is corresponding to the difference information storing unit 150 shown in FIG. 1. The release switch 114 shown in FIG. 4 is corresponding to the adjustment command receiving unit 170 shown in FIG. 1.

Now, a modified embodiment of the present embodiment is described in detail. The image capturing apparatus 10 according to the present embodiment determines the adjustment range of the optical unit 160 and the center of the adjustment range by using difference information corresponding to the focusing position, which is the closest to the adjustment position. However, instead of that, according to the modified embodiment, the adjustment range of the optical unit 160 and the center of the adjustment range may be determined by using an average value of a plurality of difference information. By using the average value of the plurality of difference information, the focus control unit 180 can minimize the gap due to errors which occur while the distance measuring unit 190 computes distance information or the focus control unit 180 performs the contrast detection by hill-climbing method.

Moreover, the image capturing apparatus 10 according to the present embodiment determines the adjustment range of optical unit 160 and the center of adjustment range by using difference information corresponding to the focusing position, which is the closest to the adjustment position. However, instead of that, according to the modified embodiment, the difference information storing unit 150 may store one difference information. In this case, the difference information computing unit 200 updates difference information stored in the difference information storing unit 150 with newly computed difference information. The focus control unit 180 determines the adjustment range of optical unit 160 by using the newest difference information.

Moreover, in case difference indicated by difference information stored in the difference information storing unit 150 is within a predetermined range, the focus control unit 180 may narrow the adjustment range of optical unit 160.

Moreover, the image capturing apparatus 10 according to the present embodiment stores difference information in the difference information storing unit 150 corresponding to the focusing position. However, instead of that, according to the modified embodiment, the difference information may be corresponding to distance information and stored in the difference information storing unit 150. In this case, the focus control unit 180 reads out difference information corresponding to the distance information, which is the closest to new distance information, from the difference information storing unit 150.

As apparent from the above description, according to the present invention, it is possible to perform a contrast detection by hill-climbing method in a proper range.

Although the present invention has been described by way of exemplary embodiments, it should be understood that those skilled in the art might make many changes and substitutions without departing from the spirit and the scope of the present invention which is defined only by the appended claims.

What is claimed is:

1. A focusing apparatus for adjusting focus of an optical instrument comprising:

an optical unit for acquiring light from a subject and forming a subject image;

a contrast detecting unit for detecting contrast value of the subject image acquired by said optical unit;

a distance measuring unit for computing distance information indicating a distance from the focusing apparatus to the subject;

an adjustment command receiving unit for receiving command information indicating a request to adjust the focus of said optical unit;

a focus control unit for performing contrast detection by hill-climbing method by acquiring a contrast value step-by-step by moving at least a part of said optical unit step-by-step, and detecting a position of said optical unit, where the acquired contrast value becomes a maximum value, as a focusing position, when said adjustment command receiving unit receives the command information, said focus control unit determining an adjustment range of said optical unit, which performs the contrast detection by hill-climbing method, on the basis of the difference information stored in said difference information storing unit and the distance information newly computed by said distance measuring unit;

a difference information computing unit for computing difference information indicating the difference between the focusing position detected by said focus control unit, which performs the contrast detection by hill-climbing method, and an adjustment position of said optical unit corresponding to the distance information computed by said distance measuring unit; and a difference information storing unit for storing the difference information computed by said difference information computing unit, wherein said distance measuring unit newly computes distance information when said adjustment command receiving unit receives new command information, and said focus control unit determines a condition for the contrast detection by hill-climbing method on the basis of the difference information stored in said difference information storing unit and distance information newly computed by said distance measuring unit.

2. A focusing apparatus as claimed in claim 1, wherein said focus control unit determines width of said adjustment range of said optical unit.

3. A focusing apparatus as claimed in claim 1, wherein said focus control unit determines a center of said adjustment range of said optical unit.

4. A focusing apparatus according to claim 1, wherein the focus control unit widens the adjustment range of the optical unit when the difference information is large.

5. A focusing apparatus according to claim 1, wherein the focus control unit narrows the adjustment range of the optical unit when the difference information is small.

* * * * *